US007448526B2

(12) United States Patent
Haynie et al.

(10) Patent No.: US 7,448,526 B2
(45) Date of Patent: Nov. 11, 2008

(54) ADAPTER FOR FRICTION STIR WELDING

(75) Inventors: Timothy J. Haynie, Union, MI (US); Anthony D. Hofferbert, Grafton, WI (US); Adam H. Koppy, Jones, MI (US)

(73) Assignee: Transformation Technologies, Inc., Elkhart, IN (US)

( * ) Notice: Subject to any disclaimer, the term of this patent is extended or adjusted under 35 U.S.C. 154(b) by 397 days.

(21) Appl. No.: 10/915,657

(22) Filed: Aug. 10, 2004

(65) Prior Publication Data
US 2006/0032887 A1 Feb. 16, 2006

(51) Int. Cl.
B23K 20/12 (2006.01)
(52) U.S. Cl. .................................. 228/2.1; 228/112.1
(58) Field of Classification Search .............. 228/112.1, 228/2.1
See application file for complete search history.

(56) References Cited

U.S. PATENT DOCUMENTS

| 5,713,507 | A | | 2/1998 | Holt et al. |
| 5,718,366 | A | | 2/1998 | Colligan |
| 5,893,507 | A | * | 4/1999 | Ding et al. ................... 228/2.1 |
| 6,050,475 | A | * | 4/2000 | Kinton et al. ............ 228/112.1 |
| 6,102,636 | A | * | 8/2000 | Geise ........................... 409/231 |
| 6,199,745 | B1 | * | 3/2001 | Campbell et al. ........ 228/112.1 |
| 6,299,050 | B1 | | 10/2001 | Okamura et al. |
| 6,302,315 | B1 | | 10/2001 | Thompson |
| 6,499,649 | B2 | | 12/2002 | Sayama et al. |
| 6,732,900 | B2 | * | 5/2004 | Hansen et al. ................ 228/2.1 |
| 6,742,696 | B2 | * | 6/2004 | Thompson ................... 228/103 |
| 6,799,708 | B2 | * | 10/2004 | von Strombeck et al. .... 228/2.1 |
| 6,874,672 | B2 | * | 4/2005 | Okamoto et al. .......... 228/112.1 |
| 7,156,275 | B2 | * | 1/2007 | Larsson ....................... 228/2.1 |
| 2002/0179673 | A1 | * | 12/2002 | Strombeck et al. ........... 228/1.1 |
| 2003/0183673 | A1 | * | 10/2003 | Hansen et al. ................ 228/2.1 |
| 2004/0079787 | A1 | * | 4/2004 | Okamoto et al. .......... 228/112.1 |
| 2005/0263569 | A1 | * | 12/2005 | Miller ..................... 228/112.1 |
| 2006/0081679 | A1 | * | 4/2006 | Sato et al. .................... 228/2.1 |

FOREIGN PATENT DOCUMENTS

JP 2004105975 A * 4/2004

* cited by examiner

Primary Examiner—Kiley Stoner
(74) Attorney, Agent, or Firm—Baker & Daniels LLP

(57) ABSTRACT

An adapter for use in friction stir welding is configured to be mountable in and rotated by a standard milling machine. In one embodiment, the adapter includes an upper housing, a lower housing, and a mounting element for transmitting rotational movement from the milling machine. At least a portion of the mounting element is mounted in the upper housing. The adapter may also include a tool holder connected to the lower housing and rotated by the mounting element; and a displacement mechanism for providing movement of the tool holder relative to the mounting element. The displacement mechanism may be isolated from the rotational movement of the mounting element and the tool holder. The displacement mechanism of the adapter may also include at least one piston cylinder assembly. In one embodiment, the upper housing and the lower housing form a part of the piston cylinder assembly. In another embodiment, the piston cylinder assembly is a discreet mechanism extending between the upper housing and the lower housing. The adapter may also include at least one linkage connected to and extending between the upper housing and the lower housing.

29 Claims, 10 Drawing Sheets

ADAPTER FOR FRICTION STIR WELDING

BACKGROUND OF THE INVENTION

The present invention relates generally to the process commonly known as friction stir welding wherein heat is generated to weld the work pieces together by rotating a pin tool in the weld seam. More particularly, the invention relates to an adapter for use in friction stir welding that is suitable for use on a standard milling or other machine capable of providing rotational movement, and the adapter includes a mechanism for adjustment of the weld tool along a longitudinal axis thereof.

Friction stir welding has been known for several years and involves a process of welding component parts together using friction heat generated at a welding joint to form a plasticized region that solidifies to join work piece sections together. To perform the welding, a probe may be inserted into a joint between the work piece stations. The probe typically includes a tool pin with either a built-in shoulder or the tool pin is inserted into a chuck, which has a shoulder. The shoulder is urged against the surface of the work pieces during the welding, and the pin and shoulder typically spin together to generate heat to form the plasticized region. Either the work piece or pin/shoulder are moved so that the pin and shoulder move along the length of the weld joint, thereby welding the component parts together.

In order to produce a quality friction stir weld, various parameters must be tightly controlled. One of the parameters to control is the depth of the probe. It is known in the art to control the depth of the probe using either a position control or a load control. A position control friction stir welder merely follows preprogramed coordinates. However, a position control system can be very sensitive to the work piece set up and tolerances. Additionally, a position control system has no way to compensate for any misalignments or imperfections in the set up, and may result in weld defects.

Force control friction stir welding systems have been developed so that the penetration and weld parameters are based upon force feedback from the rotating tool. However, these types of friction stir welding systems tend to be extremely costly and may require a special machine set up.

It is, therefore, desirable to provide a friction stir welding adapter that can be mounted to a standard milling or other rotary machine without the need for providing a specialized costly machine set up. It would further be desirable if such an adapter could be provided with a force control to assist in controlling the weld quality. One friction stir welding device is disclosed in U.S. Pat. No. 5,893,507 to Ding et al., which is incorporated in its entirety herein by reference. The device in Ding et al. includes a friction stir welding tool pin that is coupled to an axially moveable dual acting piston. The tool pin and piston are located in an arbor and mounted in a spindle housing. Ding et al. discloses that the tool pin and piston are rotated by a hydraulic motor that is also located within the spindle housing. Ding et al. does not disclose attaching the friction stir welding device to a standard milling or other rotating machine.

Another friction stir welding device is disclosed in U.S. Patent Application Publication No. 2002/017963 A1 to Strombeck et al., which is incorporated in its entirety herein by reference. Strombeck et al. discloses that the device may be utilized on a robot. The device in Strombeck et al. has a built in backing member so that the work pieces need not be supported immediately beneath the weld joint. The device also includes a housing, a rotating shaft and welding pin. The rotation of the shaft is isolated from the housing by a set of bearings. The device also includes a double acting piston for use in raising and lowering the shaft. The device also includes an upper shoulder that rotates with the shaft in one embodiment and that is isolated from the rotation of the shaft in another embodiment. The component parts to be welded are placed between the upper shoulder and the backing member with the shaft aligned with the weld joint. The double acting piston controls the pressure of the shoulder and the backing member relative to the component parts held therebetween.

It is an object of the invention to provide an adapter for use in friction stir welding that may be mounted on a standard milling or other rotating machine, and which provides pressure control in an unique manner and includes an unique linkage.

SUMMARY OF THE INVENTION

It is a feature of one embodiment of the invention to provide an adapter for use in friction stir welding that is configured to be mountable in, rotated by, and laterally moved by a standard milling machine. The adapter includes an upper housing, a lower housing, and a mounting element for transmitting rotational movement from the milling machine. At least a portion of the mounting element is mounted in the upper housing. The adapter may also include a tool holder connected to the lower housing and rotated by the mounting element; and a displacement mechanism for providing movement of the tool holder relative to the mounting element. The displacement mechanism may be isolated from the rotational movement of the mounting element and the tool holder.

The displacement mechanism of the adapter may also include at least one piston cylinder assembly. In one embodiment, the upper housing and the lower housing form a part of the piston cylinder assembly. The lower housing may include a sidewall, and the upper member includes a flange located to the interior of the sidewall. The lower housing may include a pair of ports extending through the sidewall for providing a pressurized fluid to operate the displacement mechanism. One of the ports may be located below the flange of the upper housing with the other port being located above the flange of the upper housing.

In another embodiment, the piston cylinder assembly is a discreet mechanism extending between the upper housing and the lower housing.

The adapter may also include at least one linkage connected to and extending between the upper housing and the lower housing. In one embodiment the adapter includes three linkages spaced equidistant around the mounting element and the tool holder. The linkages permit axial movement of the lower housing relative to the upper housing, while preventing lateral movement of the lower housing relative to the upper housing. The linkage may include a first portion pivotally connected to the upper housing and a second portion pivotally connected to the lower housing. The first portion and the second portion of the linkage are also pivotally connected to one another.

In one embodiment of the adapter the upper housing and lower housing are connected to one another with a slot and key or a roller ball and spline connection. This permits axial movement of the lower housing relative to the upper housing, while transferring rotational movement of the mounting element to the tool holder.

The adapter may further include a linear measuring device connected to and extending between the upper housing and the lower housing for measuring relative linear displacement between the housings.

The adapter may also include an anti-rotation mount or projection on one of either the upper or lower housings to prevent rotation thereof.

Additionally, the adapter may include a pin tool mounted axially in an opening through the tool holder, and a second displacement mechanism, connected to the pin tool for moving said pin tool relative to said tool holder.

In another embodiment, the adapter includes a spring biasing the tool holder in an upward direction and the displacement mechanism provides movement of the tool holder in a direction opposite the force of the spring.

The adapter may also include a pair of bearing assemblies. One of the bearing assemblies may be mounted between the upper housing and the mounting element, and the other bearing assembly may be mounted between the lower housing and the tool holder.

In addition, the adapter may include an inner support member, wherein the tool holder is connected to the inner support member. The mounting element may include a slot, and the inner support member may include a mating key such that the slot and key transfer rotational movement from the mounting element to the inner support member while permitting axial movement therebetween.

It is a feature of the invention to provide another embodiment of an adapter for use in friction stir welding that is configured to be mountable in a standard milling machine, which includes, an upper housing, a lower housing, a mounting element for transmitting rotational movement from the milling machine, a tool holder for holding a friction stir welding tool wherein the tool holder is connected to the lower housing and rotated by the mounting element, a displacement mechanism for providing movement of the friction stir welding tool relative to the mounting element, and an expandable linkage connected to and extending between the upper housing and the lower housing.

The adapter may include three linkages spaced equidistant around the mounting element and the tool holder.

The linkage may permit axial movement of the lower housing relative to the upper housing, while preventing lateral movement of the lower housing relative to the upper housing.

The linkage may include a first portion pivotally connected to the upper housing and a second portion pivotally connected to the lower housing. The first portion and the second portion of the linkage may also be pivotally connected to one another.

It is a feature of another embodiment of the invention to provide an adapter for use in friction stir welding that is configured to be mountable in and rotated by a standard milling machine, and that includes an upper housing, a lower housing, a mounting element for transmitting rotational movement from the milling machine, a tool holder connected to the lower housing and rotated by the mounting element, and a displacement mechanism for providing movement of the tool holder relative to the mounting element, wherein the displacement mechanism includes at least one piston cylinder assembly with the upper housing and the lower housing form a part of the piston.

The lower housing may include a sidewall, and the upper housing may include a flange located to the interior of the sidewall. The lower housing may include a pair of ports extending through the sidewall providing a pressurized fluid to operate the displacement mechanism. One of the ports may be located below the flange of the upper housing, and the other port may be located above the flange of the upper housing.

It is a further feature of the invention to provide an embodiment of an adapter for use in friction stir welding that is configured to be mountable and rotated by a standard milling machine, wherein the adapter includes a mounting element for transmitting rotational movement from the milling machine, a tool holder for holding a friction stir welding tool such that the tool holder is rotated by the mounting element, a displacement mechanism for providing movement of the friction stir welding tool relative to the mounting element, and a spring biasing the friction stir welding tool in an upward direction such that the displacement mechanism provides movement of the friction stir welding tool in a direction opposite the force of the spring.

It is yet another feature of the invention to provide an embodiment of an adapter for use in friction stir welding that is configured to be mountable and rotated by a standard milling machine, wherein the adapter includes a housing having an upper portion and a lower portion, a mounting element for transmitting rotational movement from the milling machine with at least a portion of the mounting element mounted in the housing, a tool holder mounted in at least part of the housing wherein the tool holder is rotated by the mounting element, and a displacement mechanism for providing movement of the tool holder relative to the mounting element. The adapter in this embodiment may also include an inner support member with the tool holder connected to the inner support member. One of either the mounting element or inner support may include a slot, and the other of the mounting element or inner support member may include a key or a roller ball/spline so to transfer rotational movement from the mounting element to the inner support member while permitting axial movement therebetween.

BRIEF DESCRIPTION OF THE DRAWINGS

The above-mentioned and other features and objects of this invention and the manner of obtaining them will become more apparent, and the invention itself will be better understood by reference to the following description of embodiments of the present invention taken in conjunction with the accompanying drawings, wherein.

Figure 1:
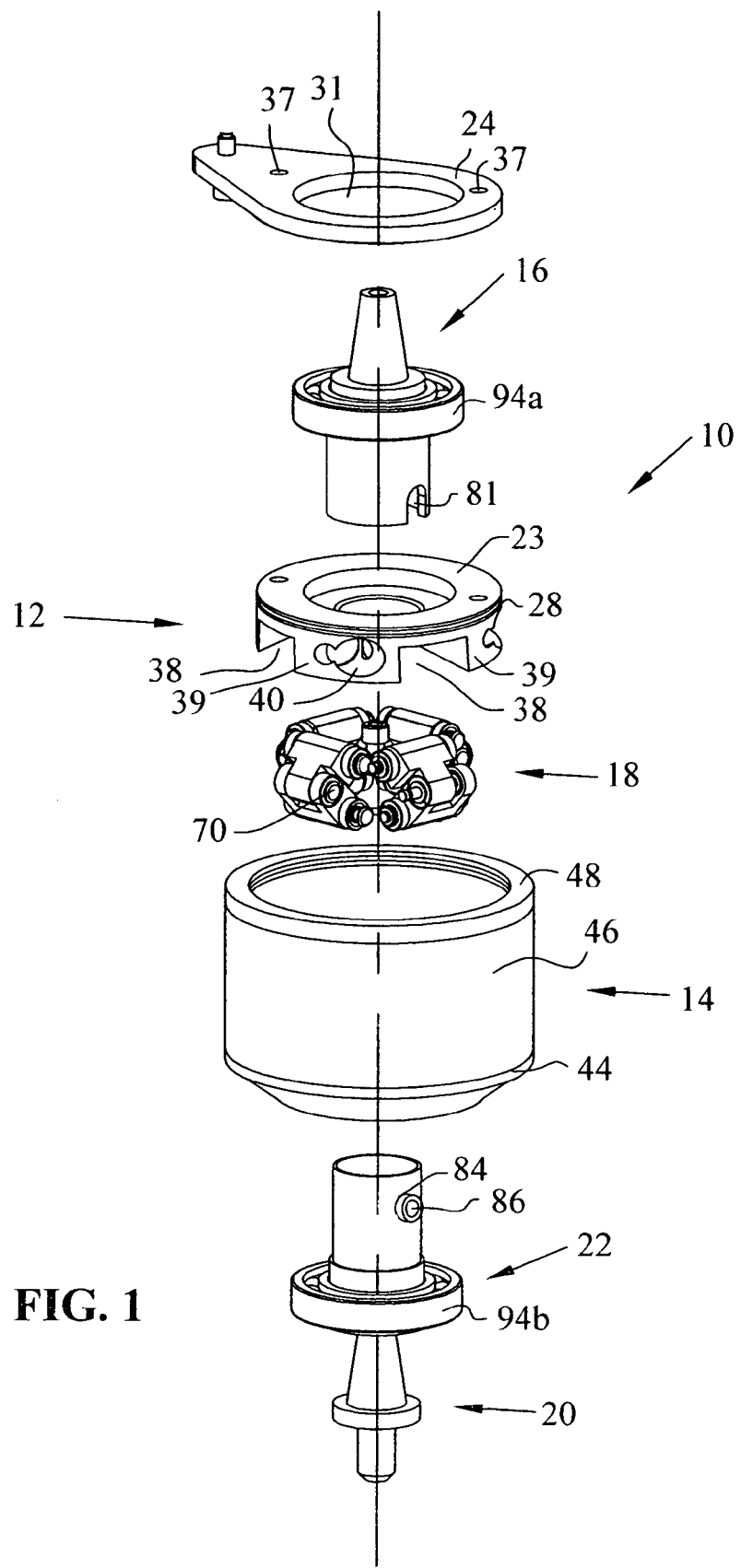
FIG. 1 is an exploded perspective view of one embodiment of an adapter for use in friction stir welding.
Figure 2:
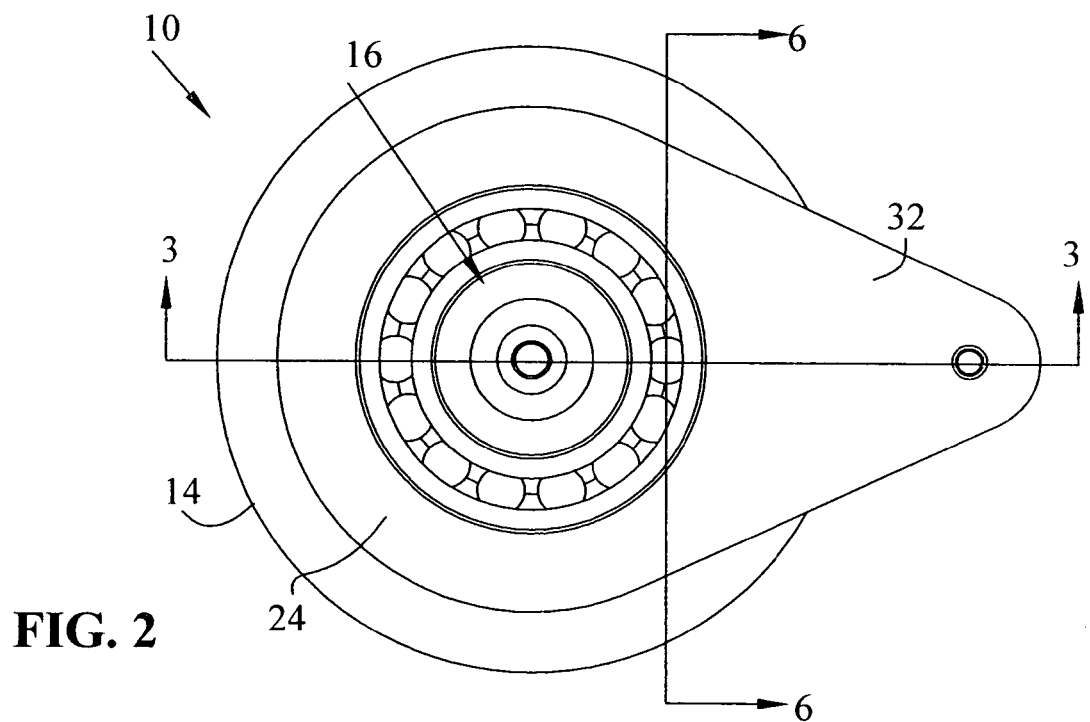
FIG. 2 is a top plan view of the adapter of FIG. 1 in assembled form.
Figure 3:
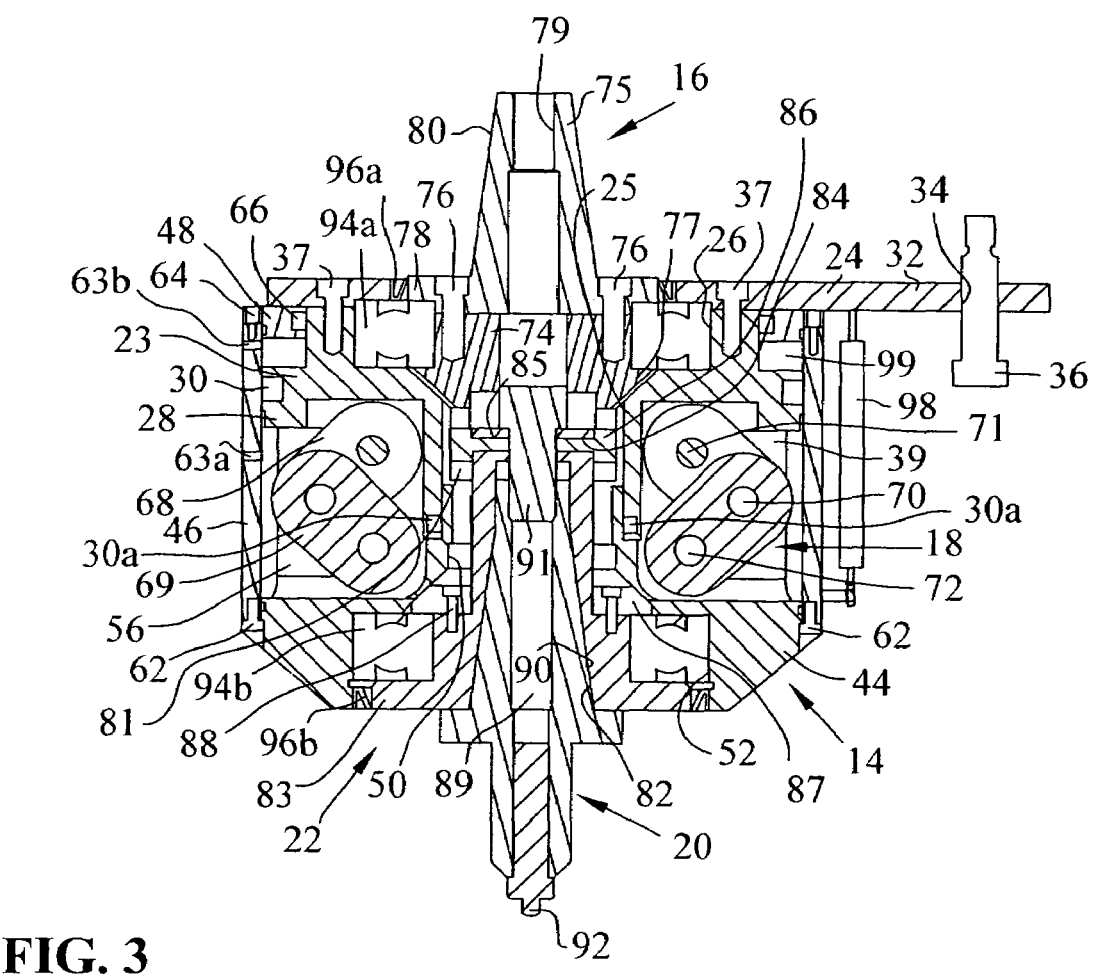
FIG. 3 is a cross-sectional view through the adapter of FIG. 1 taken along the plane 3-3 as shown in FIG. 2 and showing a friction stir welding tool in an retracted first position.
Figure 4:
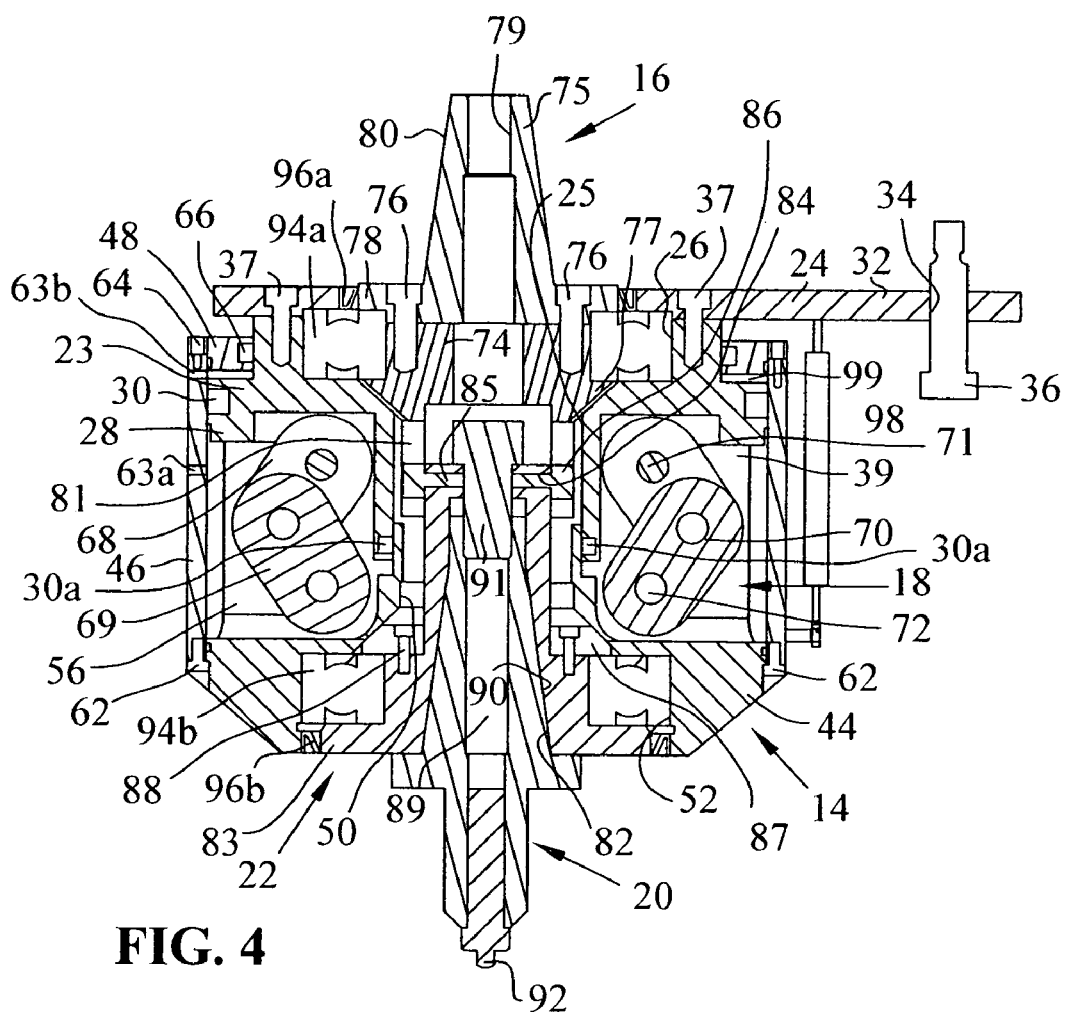
FIG. 4 is a cross-sectional view taken along the same plane as FIG. 3 with the friction stir welding tool in a second extended position.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, but such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings and which are described below. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Referring now to FIGS. 1-4, a first embodiment of an adapter for use in friction stir welding is generally indicated as 10. Adapter 10 is configured to be mountable and rotated by a standard milling type machine (not shown), as are well known. The milling machine or other known machine for imparting rotational movement can be used to provide vertical and lateral movement of the adapter to move it along the weld seam; however, the adapter is also designed to provide adjustments in a vertical orientation or in any orientation that is generally along the longitudinal axis of the weld tool.

Adapter 10 includes an upper housing generally indicated as 12, a lower housing generally indicated as 14, a mounting element generally indicated as 16, an expandable linkage generally indicated as 18, a tool holder generally indicated as 20 and an inner support generally indicated as 22. In this embodiment, upper housing 12 and lower housing 14 form part of an annular piston and cylinder assembly for use in making fine vertical adjustments to tool holder 20.

Upper housing 12 has a generally cylindrical configuration in the embodiment shown and includes a main body 23 and a cap 24. Main body portion 23 includes a through bore 25, a counterbore 26, and an outwardly extending flange 28. Outwardly extending flange 28 includes a groove 30 around the outer circumference thereof for receipt of an O-ring or other sealing member (not shown), and main body 23 includes a groove 30a for receipt of an O-ring or other sealing member (not shown) to seal against lower housing 14. Cap 24 of upper housing 12 includes an aperture 31 and a projection 32 with a through hole or slot 34 for receipt of a pin or bolt 36 that can be used to secure adapter 10 so that upper housing member 12 does not rotate with mounting element 16. Cap 24 is mounted to main body 23 using bolts or other fasteners (not shown) inserted in holes 37.

Main body 23 of upper housing 12 also includes cavities 38 extending into the bottom end for receipt of respective expandable linkages 18. In the embodiment shown, upper housing 12 includes four cavities, one for each linkage 18. Separating cavities 38 are divider walls 39. Divider walls 39 include chambers 40, which provide access for installing linkages 18, and holes 41a, 41b that extend through the divider walls to the chambers for attaching the linkages through.

Figure 5:
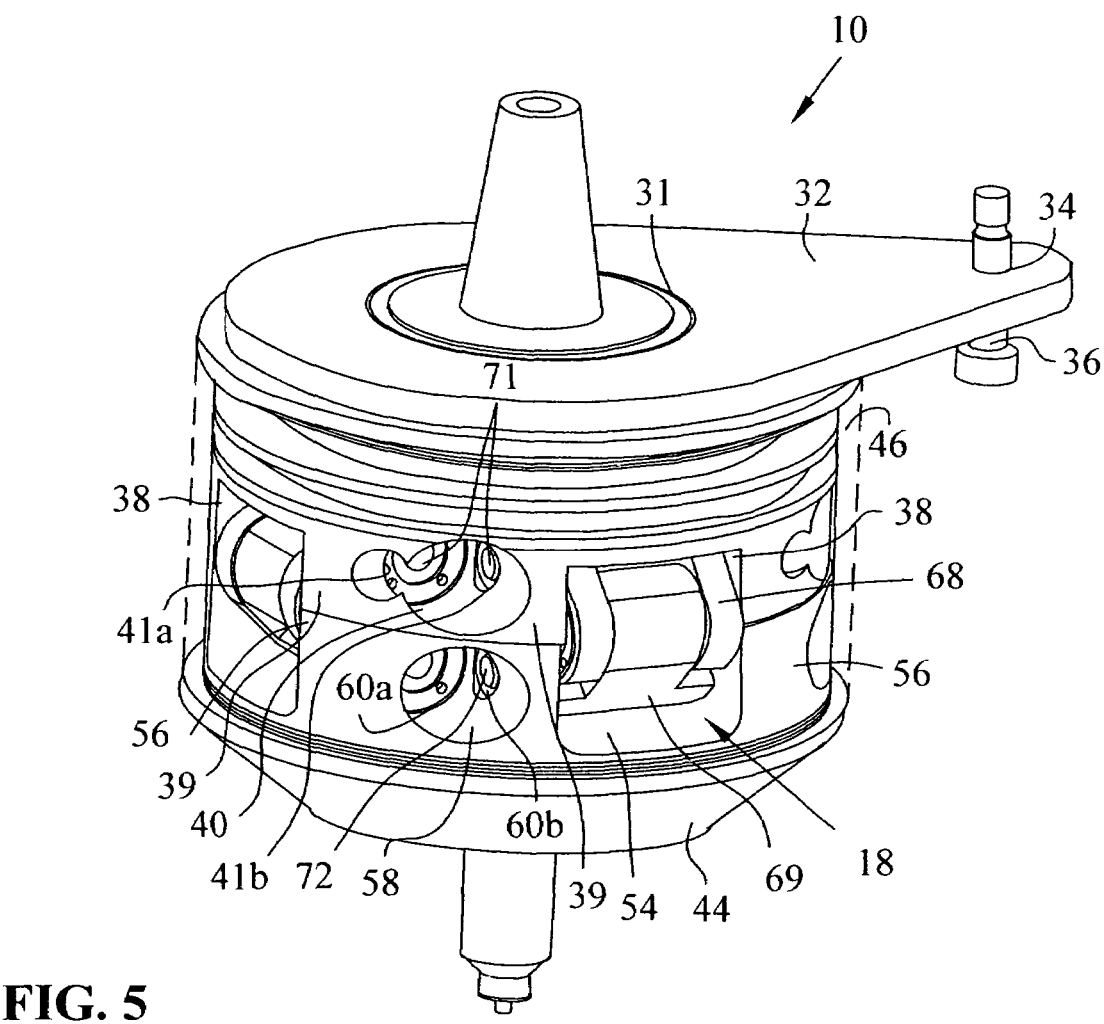
FIG. 5 is a perspective view of the adapter of FIG. 1 in assembled form shown with a portion of the housing removed.
Figure 6:
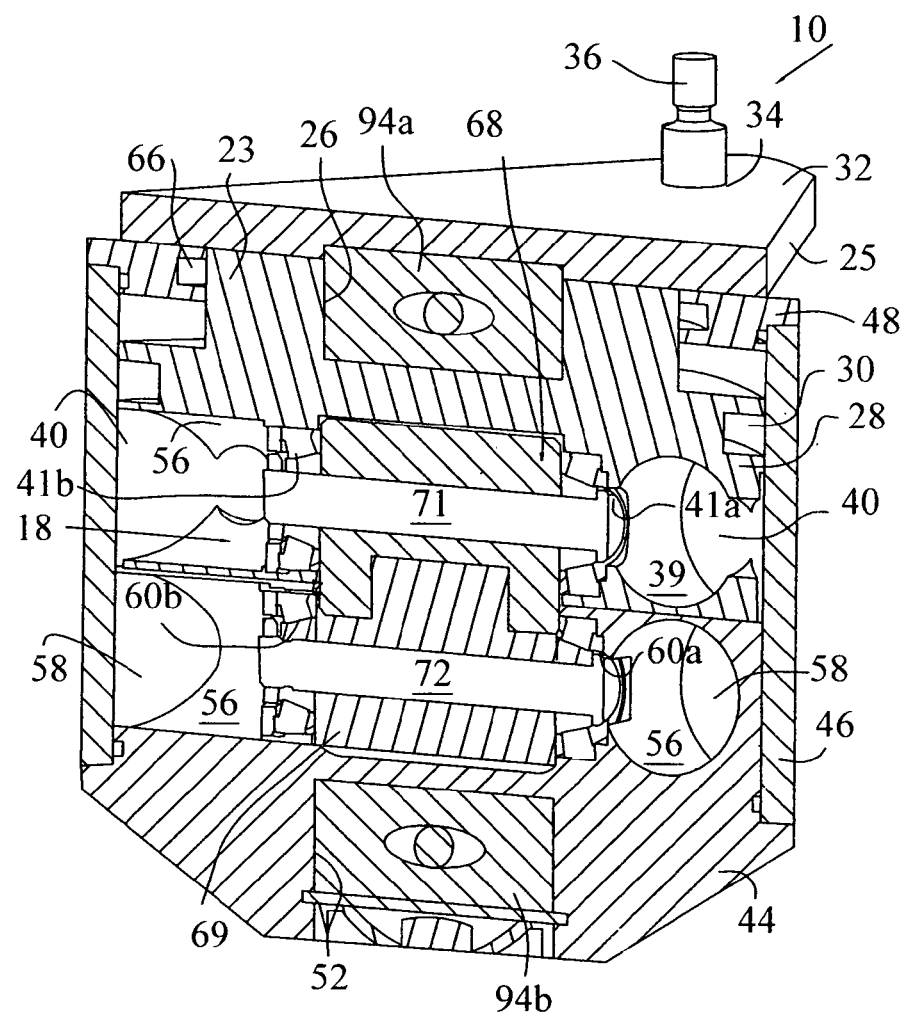
FIG. 6 is a cross-sectional view through the adapter of FIG. 1 taken along the plane 6-6 as shown in FIG. 2.

Lower housing 14 has a generally cylindrical/annular configuration and includes a main body 44, a tubular side wall 46, and an inwardly extending lip or flange 48. Main body 44 of lower housing 14 includes a through bore 50, a counterbore 52, and cavities 54 for receipt of respective expandable linkages 18. As shown in FIG. 5, cavities 54 align with cavities 38 to receive linkages 18. Separating cavities 54 are divider walls 56, which include chambers 58 to provide access for installing linkages 18 and holes 60a, 60b that extend through the divider walls to the chambers for attaching the linkages through. Side wall 46 may be attached to main body 44 using bolts or other fasteners (not shown) through holes 62 or may be otherwise attached such as by welding. Alternately, side wall 46 may be formed as an integral structure with main body 44. Side wall 46 includes a pair of ports 63a, 63b, which are axially offset from one another and extend through the side wall for providing a pressurized fluid into cavities 38 and cavities 54, and also the area between flange 28 and lip 48, respectively. Lip 48 is attached to the upper end of side walls 46 opposite main body 44 using bolts or other fasteners (not shown) through holes 64 or may otherwise be attached by known methods such as welding. Lip 48 includes an inner groove 66 for receipt of an O-ring or other sealing member (not shown).

Expandable linkage 18 includes an upper link 68 and a lower link 69, which are pivotally connected to one another with a pin or bolt 70. Upper link 18 is pivotally connected to main body 23 of upper housing 12 with a pin or bolt 71 that is pivotally retained in respective holes 41a, 41b of divider walls 39. Likewise, lower link 69 is pivotally connected to main body 44 of lower housing 14 with a pin or bolt 72 mounted in respective holes 60a, 60b in divider walls 56. This allows expandable linkage 18 to expand and contract to raise and lower tool holder 20 as further discussed below.

In the embodiment shown, mounting element 16 has a two part construction including a lower portion 74 and an upper portion 75, which when assembled are connected together using bolts or other fasteners (not shown) in mounting in holes 76. Lower portion 74 includes an outer flange 77, and upper portion 75 includes an outer flange 78. A common bore 79 extends through both lower portion 74 and upper portion 75, and upper portion 75 also includes an outer tapered surface 80 for mounting adapter 10 to a milling or other machine for providing rotation. Lower portion 74 also includes a transverse slot 81 extending into the bottom thereof for use in providing a rotational driving connection to inner support 22.

Inner support 22 includes a tapered bore 82, a lower outward extending flange 83, a transverse bore 84 and a pin or key 85 located in transverse bore 84 having roller heads 86. Inner support 22 also includes a retainer ring 87 that may be secured to the inner support using bolts or other fasteners (not shown) in holes 88.

In the present embodiment, tool holder 20 has a through bore 89 and a tapered outer surface 90 for mating with tapered bore 82 of inner support 22. The upper portion of bore 89 has internal threads for receipt of a bolt 91 to secure the tool holder in adapter 10. The bottom end of bore 89 receives a pin tool 92.

Adapter 10 also includes a pair of bearing assemblies 94a, 94b for rotationally isolating mounting element 16 from upper housing 12 and inner support 22 from lower housing 14, respectively. The bearings may be sealed by a pair of grease seals 96a, 96b. Adapter 10 may also include a linear measuring device 98 that is connected to and extends between upper housing 12 and lower housing 14. In the embodiment shown, the linear measuring device extends between cap 24 and side wall 46.

To assemble adapter 10, upper and lower link 68 and 69 are pivotally assembled together with pin 70 to make expandable linkages 18. Upper links 68 are pivotally connected to main body 23 of upper housing 12 using pins 71, and lower links 69 are connected to main body 44 of lower housing 14. At this point, the upper and lower main bodies 23 and 44 will be connected together in a manner that will allow movement along a common vertical axis, but will restrict lateral movement of the main bodies relative to one another. Linkages 18 may be sealed in respective cavities 38, 54 of adapter 10 by attaching side wall 46 with bolts or screws inserted in holes 62. An O-ring or other sealing member should be placed in groove 30 before attaching side wall 46. Lip or flange 48 may be attached by placing an O-ring or sealing member in groove 66 and inserting bolts or screws into holes 64. In this manner, a first seal will be formed between the O-ring in groove 30 and side wall 46, and a second seal will be formed between the O-ring in groove 66 and main body 23 of upper housing 12, thereby creating a cavity 99 between flange 28 and lip 48.

At the upper end of adapter 10, mounting element 16 can be placed in bore 25 of main body 23, and bearing assembly 94a placed in counterbore 26. The bearing assembly is secured by bolting or screwing upper portion 75 of mounting element 16 to lower portion 74 using holes 76. In this manner, the inner race of bearing assembly 94a will be held between outer flange 77 of lower portion 74 and outer flange 78 of upper portion 75. The outer race is held between main body 23 and cap 24, which may be secured by bolts or screws in holes 37. Grease seal 96a may be inserted between cap 24 and upper portion 75 of mounting element 16 in aperture 31.

Before installing inner support 22 into adapter 10, bearing assembly 94b is placed around the inner support with the inner race resting on flange 83. Retaining ring 87 is then attached with bolts or screws inserted into holes 88 to retain the inner race of bearing assembly 94b between flange 83 and the retaining ring. Inner support 22 is inserted in bore 50 of main body 44 of lower housing 14. It should be noted that bolt 91 is inserted through the top of inner support 22 into bore 82 prior to inserting inner support 22 into main body 44 if mounting element 16 has already been installed. Otherwise, if the mounting element is not installed yet, bolt 91 may be inserted through bore 25. When installing inner support 22, roller heads 86 of pin 85 should be inserted up and into transverse slot 81. Tool holder 20 can be installed to inner support 22 by threading the upper end onto bolt 91. Flexible grease seal 96b may be used for sealing the assembly, and pin tool 92 may be installed in tool holder 20 as shown for use in friction stir welding.

For operation of adapter 10, outer taper 80 on mounting element 16 is inserted into the tool holder of a milling or other rotational machine and clamped therein as is well known. The parts (not shown) to be joined are placed together with the weld seam running in a horizontal direction in which the milling machine can cause adapter 10 to travel. To start the weld, the mounting element is rotated by the milling machine and the pin tool is lowered to the weld joint. The rotation is transferred from mounting element 16 to inner support 22 through the driving connection of roller heads 86 of pin 85, which act as a key as located in slot 81. Bolt 91 draws tool holder 20 and pin tool 92 into the tapered bore 82 of inner support 22. As should be appreciated, bearing assemblies 94a, 94b provide rotational isolation to the upper and lower housing 12 and 14, which may be secured by attaching bolt 36 to a fixed non-rotating member (not shown).

As discussed above, a vertical adjustment of the pin tool may be necessary in order to achieve a quality weld. Vertical adjustments of the pin tool in tool holder of this embodiment may be made by injecting a pressurized fluid into cavities 38, 54 through port 63a to lower the pin tool 92 (to the position shown in FIG. 4), or conversely, injecting a pressurized fluid into cavity 99 through port 63b raises the pin tool to the position shown in FIG. 3. When thusly raising and lowering pin tool 92, tool holder 22 moves vertically relative to mounting element 16 with heads 86 of pin 85 sliding up and down in slot 81 while a rotational drive connection is maintained therebetween. It should be realized that a remote pressure supply (not shown) can be used to supply the pressurized fluid, and that the force of the pin tool on the parts being welded can be measured via a remote force indicator (not shown) as is known in the art. The vertical adjustments to pin tool 92 are made to maintain the force in a predetermined operating range.

Figure 7:
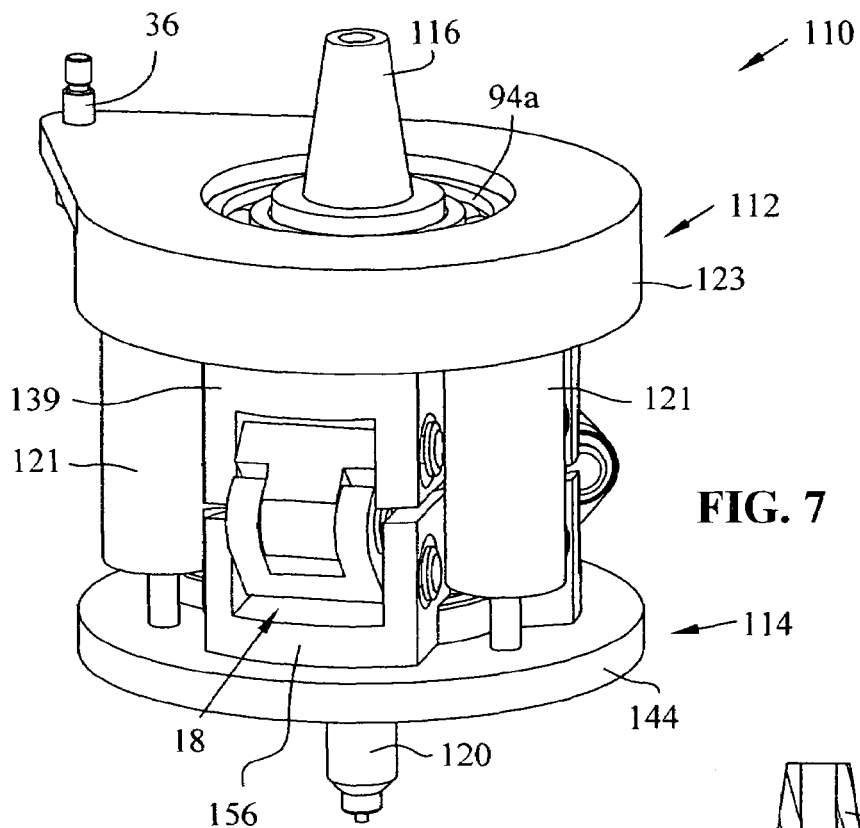
FIG. 7 is a perspective view of another embodiment of an adapter for use in friction stir welding that includes discreet piston assemblies.
Figure 8:
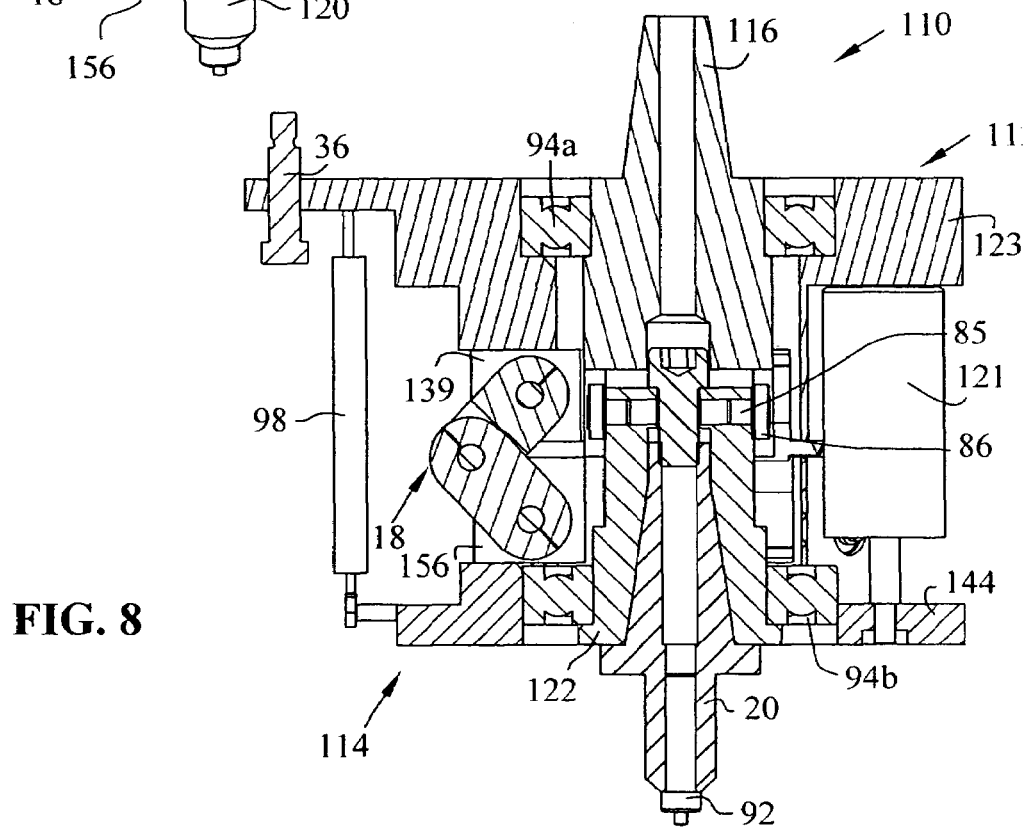
FIG. 8 is a cross-sectional view of the adapter of FIG. 7 taken along a plane similar to that of FIG. 3.

Now referring to FIGS. 7 and 8, an alternate embodiment adapter is shown generally indicated as 110. Adapter 110 functions and performs substantially the same as adapter 10 with the exception that it uses discrete piston cylinder assemblies instead of incorporating the piston cylinder into the housing. In addition, adapter 110 has only three expandable linkages in the embodiment shown. Adapter 110 includes an upper housing generally indicated as 112, a lower housing generally indicated as 114, a mounting element 116, piston/cylinder assemblies 121, and an inner support 122.

Upper housing 112 includes an upper support portion 123 and a linkage mount portion 139 extending down from the upper support portion. Lower housing 114 includes a lower support portion 144 and a linkage mount portion 156. In the embodiment shown in FIGS. 7 and 8, three expandable linkages 18 are mounted in linkage mount portions 139 and 156 in a manner similar to that as linkages 18 are mounted in adapter 10. The linkages are spaced evenly about adapter 110 at approximately 120° apart. The three piston cylinders 121 are mounted to extend between upper support portion 123 and lower support portion 144 in spaces located between linkages 18. Piston cylinder assemblies 121 may be mounted with known conventional means and may be operated using a fluid supply source (not shown) mounted on adapter 110 or remotely thereto. Although the mounting of bearing assemblies 94a, 94b has been simplified for illustrative purposes in FIGS. 7 and 8, it should be realized that mounting element 116 and inner support 122 may be configured similar to that as mounting element 16 and inner support 22, respectively, in the arrangement shown for adapter 10. Adapter 110 is operated in a similar manner as adapter 10 using piston cylinder assemblies 121 for a vertical adjustment of pin tool 92 as needed to maintain weld quality.

Figure 9:
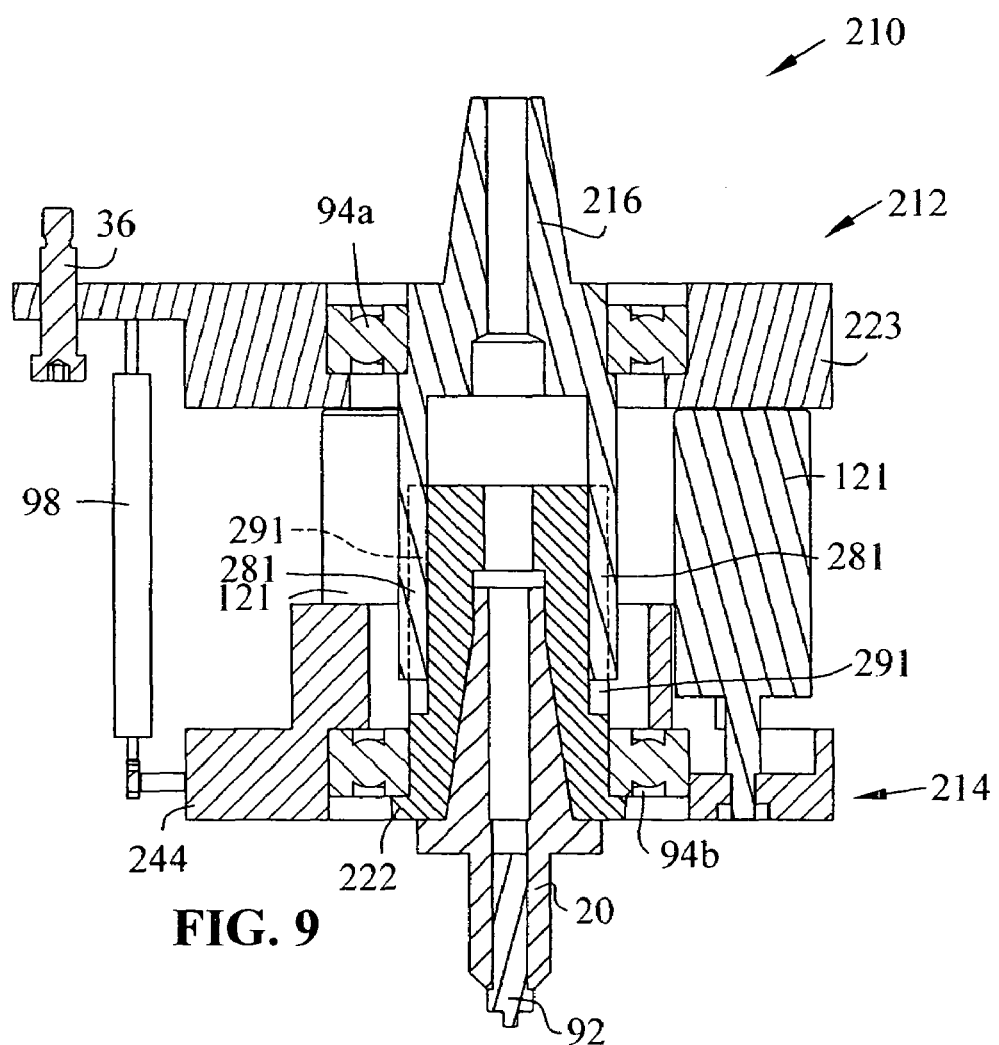
FIG. 9 is a cross-sectional view of a third embodiment of an adapter for use in friction stir welding that includes a key and slot locking configuration and taken along a plane similar to that as FIG. 3.

Now referring to FIG. 9, another alternate embodiment adapter for use in friction stir welding is shown generally indicated as 210. Adapter 210 is similar to adapter 110 except that the upper and lower housing member are connected by a keyed sliding or ball and spline joint instead of expandable linkages 18. In the embodiment shown, adapter 210 includes an upper housing generally indicated as 212, a lower housing generally indicated as 214, mounting element generally indicated as 216, and an inner support 222. Mounting element 216 includes a pair of vertically oriented keys or projections 281 for mating with and sliding within respective vertically oriented slots 291 in inner support member 222. As such, with this embodiment, transverse slot 81 is not required as with adapters 10 and 110 since key 281 provides both driving rotational movement to inner support 22 while permitting vertical adjustment between mounting element 216 and inner support 222. It should be appreciated that the terms key and slot as used above also include similar types of drives that permit some relative movement between the parts such as a ball spline drive.

Figures 10, 11:
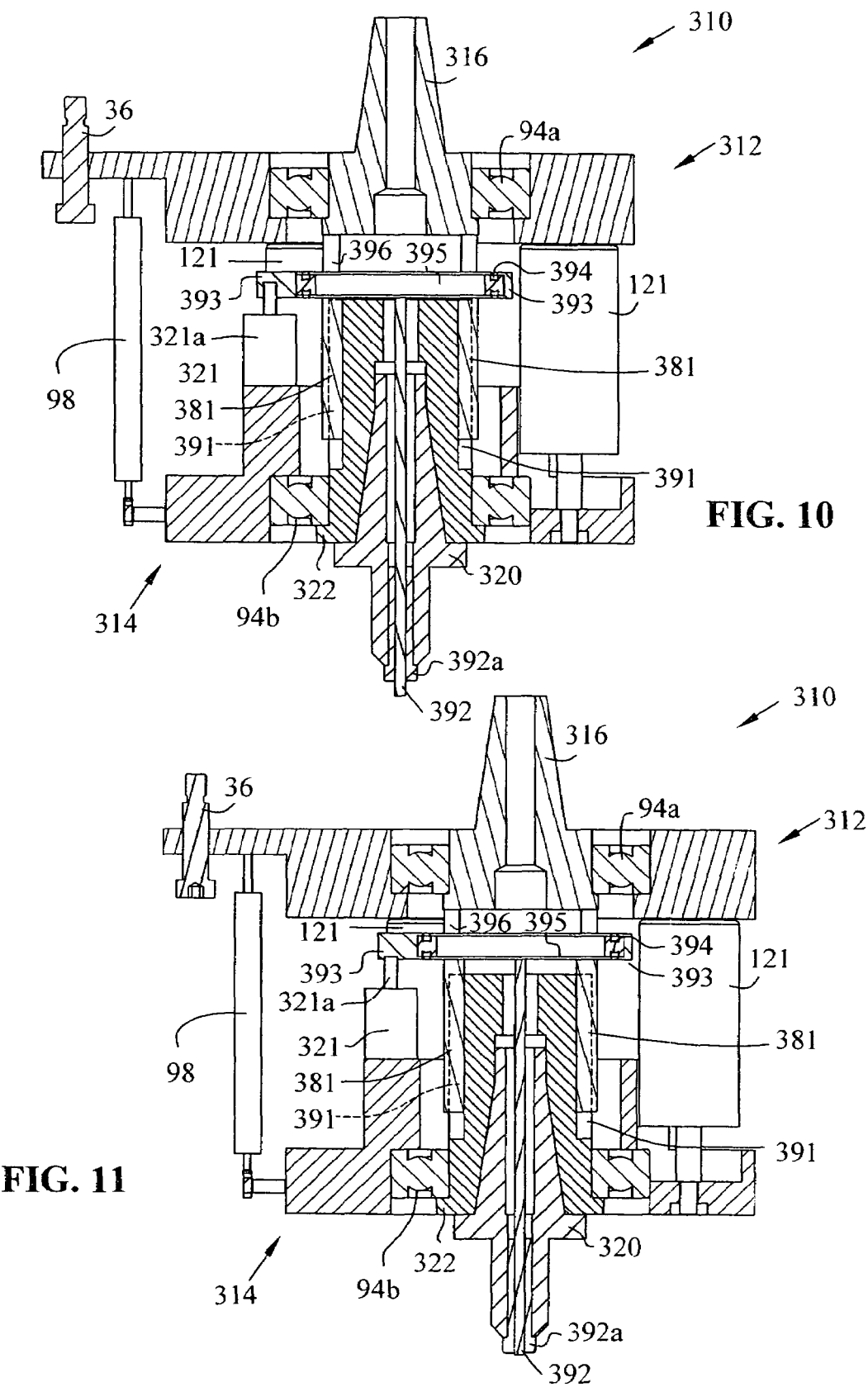
FIG. 10 is a cross-sectional view of a fourth embodiment of an adapter for use in friction stir welding taken along a plane similar to that as FIG. 3 and having an extendable pin tool shown with the pin tool extended.
FIG. 11 is a cross-sectional view of the adapter for use in friction stir welding and taken along the same plane as FIG. 10 and shown with the pin tool in a retracted position.

An additional alternate embodiment of an adapter for use in stir welding is shown generally indicated as 310 in FIGS. 10 and 11. Adapter 310 is similar to adapter 210 with the exception that adapter 310 also includes a separate vertical adjustment for the pin tool in addition to the adjustment for moving the upper housing relative to the lower housing. Adapter 310 includes an upper housing generally indicated as 312, a lower housing generally indicated as 314, a mounting element 316, a tool holder 320, a second set of piston/cylinder assemblies 321 having movable shafts 321a, and an inner support 322. As with adapter 210, mounting element 316 has a pair of vertically oriented keys or protrusions 381 that mate with and slide within slots 391 of inner support 322.

Adapter 310 also includes a vertically moveable pin tool 392, a pin tool shoulder 392a mounted in tool holder 320, a non-rotating outer pin tool actuator 393, a pin tool actuator bearing assembly 394, and a rotating inner pin tool actuator 395. Lower housing 314 is vertically moveable relative to upper housing 312 on adapter 310 the same as adapter 210, but additionally, pin tool 392 is moveable relative to pin tool shoulder 392a and tool holder 320 between a lower position as shown in FIG. 10 and a retracted position as shown in FIG. 11. Having dual vertical adjustments provides greater flexibility and control to the welding operation. A suitable number of piston/cylinder assemblies 321 are utilized, such as three, which may be interspaced between piston/cylinders 121.

In operation, shafts 321a of piston/cylinder assemblies 321 move outer pin tool actuator 393 up or down as required based upon the desired positioning of pin tool 392. Inner pin tool actuator 395 moves up or down with outer pin tool actuator 393, and pin tool 392 is connected to inner pin tool actuator 395. Inner pin tool actuator 395 is located within a transverse slot 396 in mounting element 316 to allow vertical movement thereof. It should be appreciated that inner pin tool actuator 395 will rotate with mounting element 316; however, outer pin tool actuator 393 is non-rotating as it is rotationally isolated from inner pin tool actuator 395 by pin tool actuator bearing assembly 394.

Figure 12:
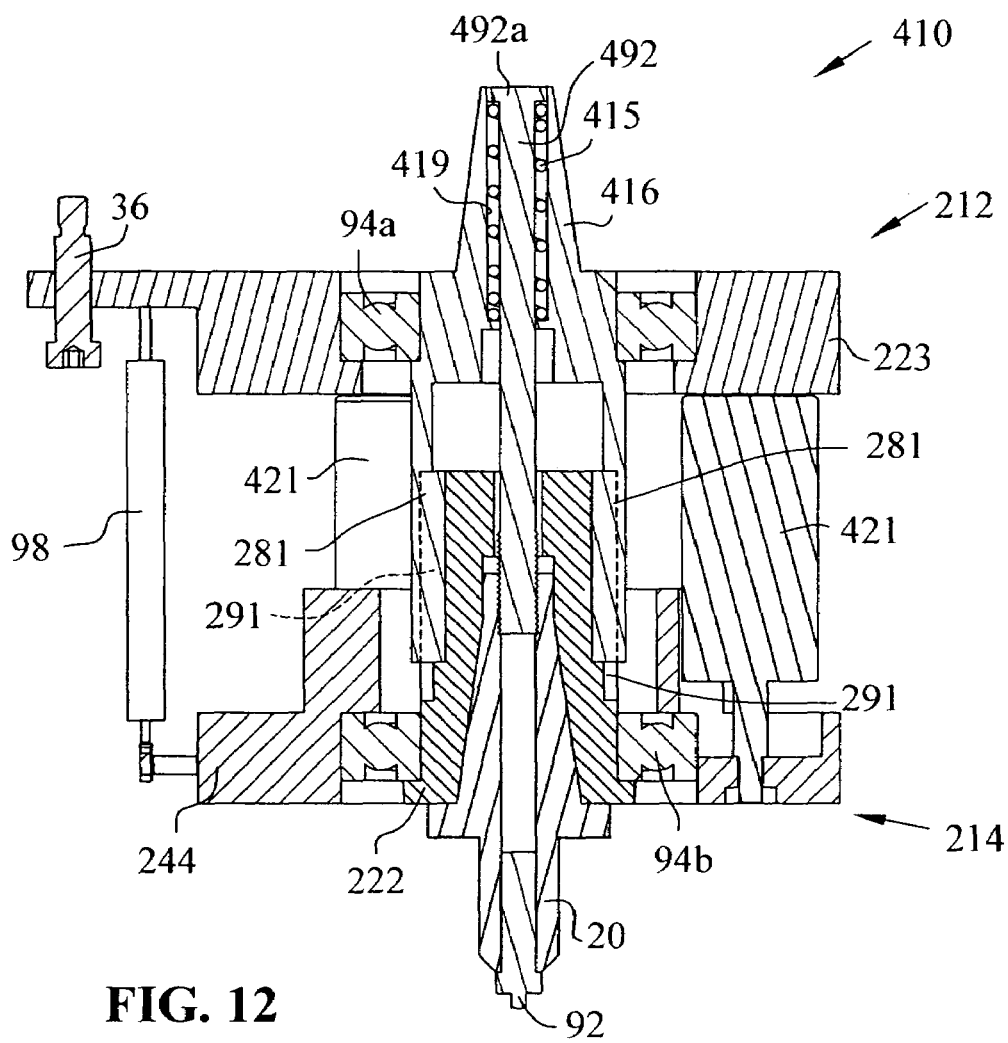
FIG. 12 is a cross-sectional view of a fifth embodiment of an adapter for use in friction stir welding having a spring biasing the friction stir welding tool upwards and taken along a plane similar to that of FIG. 3.

Yet another embodiment of an adapter for use in friction stir welding is shown generally indicated as 410 in FIG. 12. Adapter 410 is similar to adapter 210 except that piston/cylinder assemblies 121 in adapter 210 are dual acting while adapter 410 uses single acting piston/cylinder assemblies 421. Adapter 410 includes a spring 415 for providing reverse vertical movement of lower housing 214 in opposition to the direction of movement provided by single acting piston/cylinder assemblies 421. Spring 415 is located within a mounting element 416 in a counterbore 419 therein. Adapter 410 also includes pin tool 92, which is held by pin tool holder 20 and a connection member 492 having an upper head 492a. The lower end of connection member 492 is threaded into the bore of tool holder 20. When assembled, spring 415 of adapter 410 is in a compressed mode and pushing upward on head 492a, which tends to pull pin tool 92 in an upward direction. Downward movement of the pin tool is provided by piston/cylinder assemblies 421.

While the invention has been taught with specific reference to the above described embodiments, one skilled in the art will recognize that changes can be made in form and detail without departing from the spirit and scope of the invention. As such, the described embodiments are to be considered in all respects only as illustrative and not restrictive. The scope of the invention is, therefore, indicated by the following claims rather than by the description.

What is claimed is:

1. An adapter for use in friction stir welding and configured to be mountable in, rotated by, and laterally moved by a standard milling machine, said adapter comprising:
    an upper housing;
    a lower housing;
    a mounting element for transmitting rotational movement from the milling machine, at least a portion of said mounting element mounted in said upper housing;
    a tool holder connected to said lower housing and rotated by said mounting element; and
    a displacement mechanism for providing movement of said tool holder relative to said mounting element, said displacement mechanism isolated from the rotational movement of said mounting element and said tool holder.

2. The adapter for use in friction stir welding as set forth in claim 1, wherein said displacement mechanism includes at least one piston cylinder assembly.

3. The adapter for use in friction stir welding as set forth in claim 2, wherein said upper housing and said lower housing form a part of said piston cylinder assembly.

4. The adapter for use in friction stir welding as set forth in claim 3, wherein said lower housing includes a sidewall, and said upper housing includes a flange located to the interior of the sidewall.

5. The adapter for use in friction stir welding as set forth in claim 4, wherein said sidewall of said lower housing includes a pair of ports extending through said sidewall for providing a pressurized fluid, one of said ports being located below said flange of said upper housing and said other port being located above said flange of said upper housing.

6. The adapter for use in friction stir welding as set forth in claim 2, wherein said piston cylinder assembly is a discreet mechanism extending between said upper housing member and said lower housing.

7. The adapter for use in friction stir welding as set forth in claim 1, further including at least one linkage connected to and extending between said upper housing and said lower housing.

8. The adapter for use in friction stir welding as set forth in claim 7, including at least three linkages spaced equidistant around said mounting element and said tool holder.

9. The adapter for use in friction stir welding as set forth in claim 8, wherein said linkages permit axial movement of said lower housing relative to said upper housing, while preventing lateral movement of said lower housing relative to said upper housing.

10. The adapter for use in friction stir welding as set forth in claim 7, wherein said linkage includes a first portion pivotally connected to said upper housing and a second portion pivotally connected to said lower housing.

11. The adapter for use in friction stir welding as set forth in claim 10, wherein said first portion and said second portion of said linkage are also pivotally connected to one another.

12. The adapter for use in friction stir welding as set forth in claim 1, wherein said upper housing and lower housing are connected to one another with a slot and key, ball spline, or roller connection permitting axial movement of said lower housing relative to said upper housing and transferring rotational movement of said mounting element to said tool holder.

13. The adapter for use in friction stir welding as set forth in claim 1, further including a linear measuring device connected to and extending between said upper housing and said lower housing for measuring relative linear displacement between said housings.

14. The adapter for use in friction stir welding as set forth in claim 1, further including an anti-rotation mount on one of either said upper or lower housings for mounting said housings to prevent rotation thereof.

15. The adapter for use in friction stir welding as set forth in claim 1, further including a pin tool mounted axially in an opening through said tool holder, and a second displacement mechanism, connected to said pin tool for moving said pin tool relative to said tool holder.

16. The adapter for use in friction stir welding as set forth in claim 1, further including a spring biasing said tool holder in an upward direction, said displacement mechanism providing movement of said tool holder in a direction opposite the force of said spring.

17. The adapter for use in friction stir welding as set forth in claim 1, further including a pair of bearing assemblies, one of said bearing assemblies mounted between said upper housing and said mounting element, and said other bearing assembly mounted between said lower housing and said tool holder.

18. The adapter for use in friction stir welding as set forth in claim 1, further including an inner support member, said tool holder connected to said inner support member.

19. The adapter for use in friction stir welding as set forth in claim 17, wherein said mounting element includes a cam roller slot, and said inner support member includes a key, said cam roller slot and key transferring rotational movement from said mounting element to said inner support member while permitting axial movement therebetween.

20. An adapter for use in friction stir welding and configured to be mountable in a standard milling machine, said adapter comprising:
an upper housing;
a lower housing;
a mounting element for transmitting rotational movement from the milling machine;
a tool holder for holding a friction stir welding tool, said tool holder connected to said lower housing and rotated by said mounting element;
a displacement mechanism for providing movement of said friction stir welding tool relative to said mounting element; and
an expandable linkage connected to and extending between said upper housing and said lower housing.

21. The adapter for use in friction stir welding as set forth in claim 20, including at least three linkages spaced equidistant around said mounting element and said tool holder.

22. The adapter for use in friction stir welding as set forth in claim 20, wherein said linkage permits axial movement of said lower housing relative to said upper housing, while preventing lateral movement of said lower housing relative to said upper housing.

23. The adapter for use in friction stir welding as set forth in claim 20, wherein said linkage includes a first portion pivotally connected to said upper housing and a second portion pivotally connected to said lower housing.

24. The adapter for use in friction stir welding as set forth in claim 23, wherein said first portion and said second portion of said linkage are also pivotally connected to one another.

25. An adapter for use in friction stir welding and configured to be mountable in and rotated by a standard milling machine, said adapter comprising:
a upper housing;
an lower housing;
a mounting element for transmitting rotational movement from the milling machine;
a tool holder connected to said lower housing and rotated by said mounting element;
a displacement mechanism for providing movement of said tool holder relative to said mounting element; and
said displacement mechanism including at least one piston cylinder assembly, said upper housing and said lower housing forming a part of said piston cylinder assembly, whereby operation of said displacement mechanism causes relative axial movement between said upper housing and said lower housing.

26. The adapter for use in friction stir welding as set forth in claim 25, wherein said lower housing includes a sidewall, and said upper housing includes a flange located to the interior of and sealed against the sidewall.

27. The adapter for use in friction stir welding as set forth in claim 26, wherein said side wall of said lower housing includes a pair of ports extending through said sidewall for providing a pressurized fluid, one of said ports being located below said flange of said upper housing and said other port being located above said flange of said upper housing.

28. An adapter for use in friction stir welding and configured to be mountable and rotated by a standard milling machine, said adapter comprising:
a mounting element for transmitting rotational movement from the milling machine;
a tool holder for holding a friction stir welding tool, said tool holder rotated by said mounting element;
a displacement mechanism for providing movement of said friction stir welding tool relative to said mounting element; and
a spring biasing said friction stir welding tool in an upward direction, said displacement mechanism providing movement of said friction stir welding tool in a direction opposite the force of said spring.

29. An adapter for use in friction stir welding and configured to be mountable and rotated by a standard milling machine, said adapter comprising:
a housing having an upper portion and a lower portion;
a mounting element for transmitting rotational movement from the milling machine, at least a portion of said mounting element mounted in said housing;
a tool holder mounted in at least part of said housing, said tool holder rotated by said mounting element;
a displacement mechanism for providing movement of said tool holder relative to said mounting element; and
an inner support member, said tool holder connected to said inner support member and one of said mounting element or inner support including a slot, and the other of said mounting element and said inner support member including a key, said slot and key transferring rotational movement from said mounting element to said inner support member while permitting axial movement therebetween.

* * * * *